United States Patent
Cakmak et al.

(10) Patent No.: US 11,004,012 B2
(45) Date of Patent: May 11, 2021

(54) ASSESSMENT OF MACHINE LEARNING PERFORMANCE WITH LIMITED TEST DATA

(71) Applicant: INTERNATIONAL BUSINESS MACHINES CORPORATION, Armonk, NY (US)

(72) Inventors: Umit M. Cakmak, Cracow (PL); Lukasz G. Cmielowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 15/825,325

(22) Filed: Nov. 29, 2017

(65) Prior Publication Data
US 2019/0163666 A1    May 30, 2019

(51) Int. Cl.
G06N 5/04    (2006.01)
G06N 20/00    (2019.01)
G06N 5/02    (2006.01)

(52) U.S. Cl.
CPC .............. *G06N 20/00* (2019.01); *G06N 5/02* (2013.01); *G06N 5/04* (2013.01)

(58) Field of Classification Search
None
See application file for complete search history.

(56) References Cited

U.S. PATENT DOCUMENTS

| | | |
|---|---|---|
| 2016/0110657 A1 | 4/2016 | Gibiansky et al. |
| 2016/0283863 A1 | 9/2016 | Bowers et al. |
| 2016/0300156 A1 | 10/2016 | Bowers et al. |
| 2017/0061329 A1 | 3/2017 | Kobayashi et al. |

FOREIGN PATENT DOCUMENTS

WO    2016004075 A1    1/2016

OTHER PUBLICATIONS

Lam, et al., A Learning Approach to Spam Detection based on Social Networks, CEAS 2007, 2007, pp. 1-9 (Year: 2007).*
Maclin, et al., Knowledge-Based Support-Vector Regression for Reinforcement Learning, Proceedings of the IJCAI'05 Workshop on Reasoning, Representation, and Learning in Computer Games, 2005, pp. 1-6 (Year: 2005).*
Muela et al., "How to Make Machine Learning Robust Against Adversarial Inputs", 2016, http://www.cs.utep.edu/vladik/2016/tr16-95.pdf, Department of Computer Science, University of Texas at El Paso, 3 pages.

\* cited by examiner

*Primary Examiner* — Wilbert L Starks
(74) *Attorney, Agent, or Firm* — L. Jeffrey Kelly

(57) ABSTRACT

Embodiments of the present invention disclose a method, computer program product, and system for mitigating machine learning performance digression due to insufficient test data availability. A set of data is received, wherein the received set of data is parsed into a set of training data and a set of test data. A trained model is generated and the trained model is applying to the set of test data. A first set of performance values of the tested trained model are recorded and, if above a threshold, associated with a performance baseline value. A set of modified test data is generated and the trained model is applied to the set of modified test data. A second set of performance values are recorded and a performance difference value is calculated based on the performance baseline value and second set of recorded performance values. A table of results is generated, for display.

20 Claims, 4 Drawing Sheets

ASSESSMENT OF MACHINE LEARNING PERFORMANCE WITH LIMITED TEST DATA

BACKGROUND

The present invention relates generally to the field of machine learning and data management, and more particularly to computer model performance monitoring through modified test data.

In machine learning, supervised learning is the machine learning task of inferring a function from labeled training data. The training data consist of a set of training examples. In supervised learning, each example is a pair consisting of an input object (typically a vector) and a desired output value. A supervised learning algorithm analyzes the training data and produces an inferred function, which can be used for mapping new examples. An optimal scenario will allow for the algorithm to correctly determine the class labels for unseen instances. However, limited training data may cause overfitting of the algorithm or not allow tuning of the measured fitness after the injection of a set of training data. Gathering additional training data may mitigate tuning issues but additional data is not always available.

SUMMARY

Embodiments of the present invention disclose a method, computer program product, and system for mitigating machine learning performance digression due to insufficient test data availability. A set of data is received, wherein the set of data comprises a plurality of records, each record of the plurality of records comprises one or more features and associated feature values. The received set of data is parsed into a set of training data and a set of test data. A trained model is generated by applying a model to the set of training data. The trained model is applying to the set of test data. A first set of performance values of the tested trained model are recorded, wherein the first set of performance values includes at least a test data accuracy percentage value. In response to the recorded test data accuracy percentage value of the trained model being above a threshold, the recorded test data accuracy percentage value is associated with a performance baseline value. A set of modified test data is generated, wherein the generated set of modified test data comprises applying a weight value to at least one of the associated feature values of the one or more features of each record of the plurality of records associated with the set of test data. The trained model is applied to the set of modified test data. A second set of performance values are recorded, wherein the second set of performance values includes at least a modified test data accuracy percentage value. The recorded modified test data accuracy percentage value is associated with a performance results value. A performance difference value is calculated based on the performance baseline value and performance results value, and a table for display is generated, wherein the generated table includes at least the applied weight value, a class distribution value, and the performance difference value.

DETAILED DESCRIPTION

Figure 1:
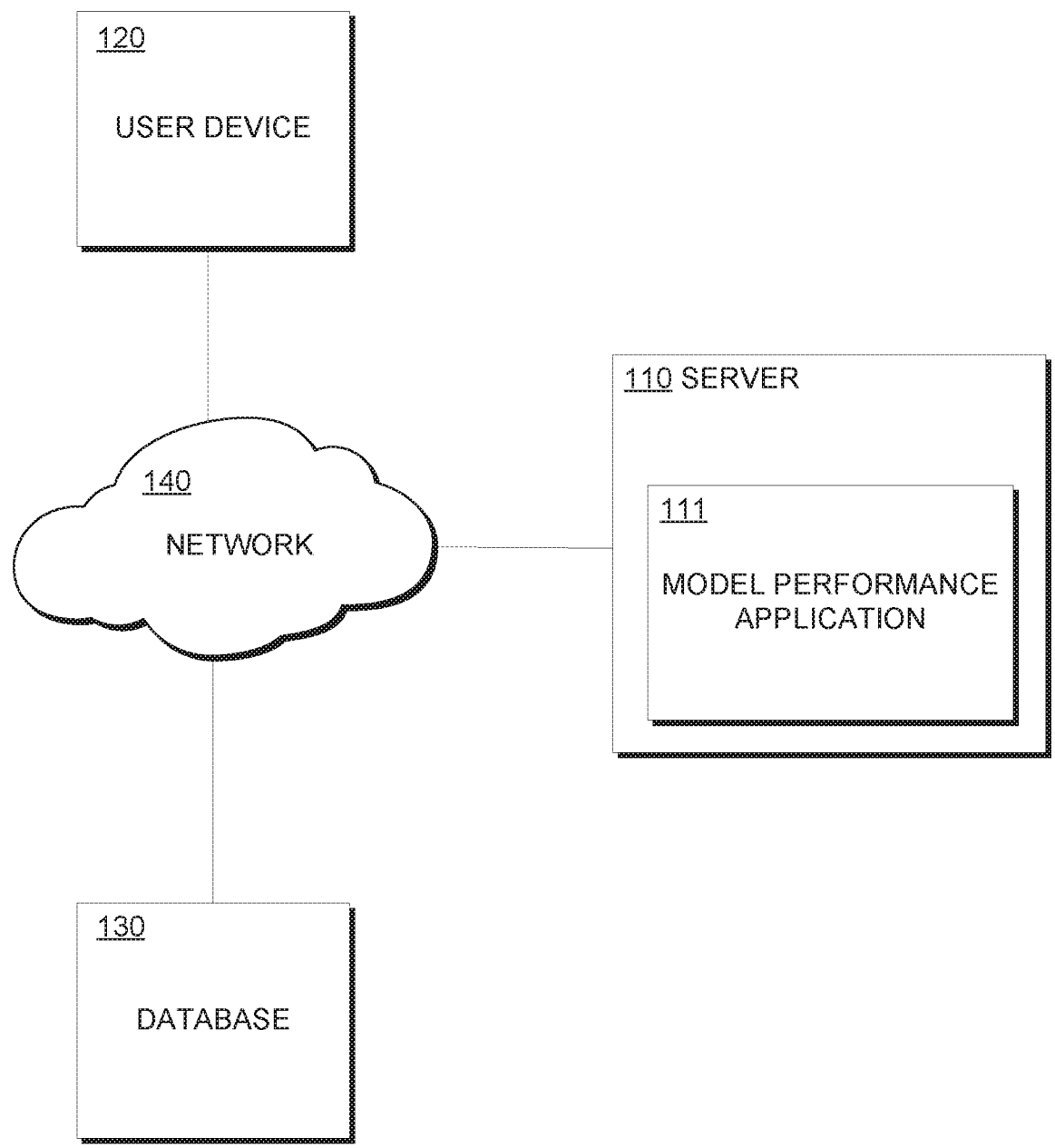
FIG. 1 is a functional block diagram illustrating a distributed data processing environment, in accordance with an embodiment of the present invention.

Embodiments of the present invention relate to the field of computing, and more particularly to computer model performance monitoring through modified test data. The following described exemplary embodiments provide a system, method, and program product to, among other things, the mitigation of machine learning performance digression due to insufficient test data availability. Therefore, the present embodiment has the capacity to improve the technical field of machine learning and data management by implementing modifications to existing test data to generate new test data in order to tune a machine learning algorithm. By generating new sets of test data the efficiency of machine learning algorithm tuning is increased as new test data is generated and available as needed.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Machine learning models' performance characteristics are an important metric to monitor when developing a machine learning algorithm. However, when a developed and trained machine learning model is deployed in a real-world setting, the model could be exposed to data which was different than the data used during model development phase. This can cause performance degradation and cause the machine learning model to need to be retrained. This can be time consuming and resource intensive. It may be advantageous to tune a machine learning model with various test data sets in order to provide more complete training to the machine learning model to mitigate performance degradation in a real-world setting.

When limited test data is available overfitting or over training may occur. Overfitting is the production of an analysis that corresponds too closely or exactly to a particular set of data and may therefore result in errors, causing the accuracy of the model is abnormally low when applied to additional data and predictive observations are unreliable. Overfitting may be caused by small sample sizes, reuse of training data for validation, or limited variation. The issues with overfitting may not readily be apparent as one consequence is abnormally high-performance accuracy. Overfitting is especially likely in cases where the training period of the model is abnormally long or where training examples are rare, causing the model to adjust to very specific random features of the training data, that have no causal relation to the target function of new data sets. In this process of overfitting, the performance on the training examples still increases while the performance on unseen data decreases, or becomes worse. It would be advantageous to have a method of mitigating the overtraining of models, in situations where only small data samples are available, by increasing the availability of different sets of test data by modifying current test data values.

The present invention will now be described in detail with reference to the Figures. FIG. 1 is a functional block diagram illustrating a distributed data processing environment, generally designated 100, in accordance with one embodiment of the present invention. Distributed data processing environment 100 includes server 110, user device 120, and database 130, all interconnected over network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between server 110 user device 120, and database 130.

In various embodiments, user device 120 may act generally to host an application capable of display, in a graphical user interface, or communicate over a network, for example network 140, via a web browser. In various embodiments of the invention, user device 120 may communicate with other computing devices within distributed data processing environment 100. User device 120 may communicate user input, or requests, over a network, for example a request to for a user provided model to be analyzed, or receive tabular data from a server, for example server 110.

In various embodiments, database 130 may be any computer readable storage media accessible via network 140. Database 130 may store an index of various records, where each record includes a plurality of features and target class labels. In various embodiments, the features may have associated values. In various embodiments, database 130 may receive data from an administrator, for example, user input via user device 120. In additional embodiments, database 130 ingests data from one or more sources, for example, documents, images, and the like. In various embodiments, database 130 may be a separate server or series of servers, a database, or other data storage, internal or external to server 110 and user device 120.

Server 110, user device 120, and database 130 may be a laptop computer, tablet computer, netbook computer, personal computer (PC), a desktop computer, a smart phone, or any programmable electronic device capable of communicating with other components of distributed data processing environment via network 140. Server 110 may include a variety of internal and external hardware components. In an embodiment, server 110 includes internal and external hardware components as depicted and described in further detail with respect to FIG. 4. In an exemplary embodiment of the present invention, server 110 includes model performance application 111 and it should be appreciated that the function of model performance application 111 can be included in user device 120, database 130, or any computer component capable of communication via network 140.

In various embodiments, model performance application 111 will generally receive data, or sets of data, that include one or more records, each record includes at least one feature that may have an associated value. Model performance application 111 may parse the received data into two sets, a set of training data and a set of test data. Model performance application 111 may apply a machine learning model to the set of training data, or train a machine learning model. Model performance application 111 may apply the trained model to the set of test data and record the performance of the trained model as a performance score. This performance score is labeled, or associated with, a baseline performance score. Model performance application 111 may modify the set of test data and apply the trained model to the modified set of test data and record the new performance score. This second performance score is labeled, or associated with, a performance results score. Model performance application 111 may compare the baseline performance score and the performance results score as a ratio, or performance ratio. Model performance application 111 may generate a table for display where the generated table includes at least a first percent value, representing the percent the test data was modified, and a second percent value, representing the percent change of performance. For example, if 20% of the test data was modified and the change in performance was 4%, model performance application 111 may generate a table for display with a percent modified of 20% and a performance change of 4%.

Figure 2:
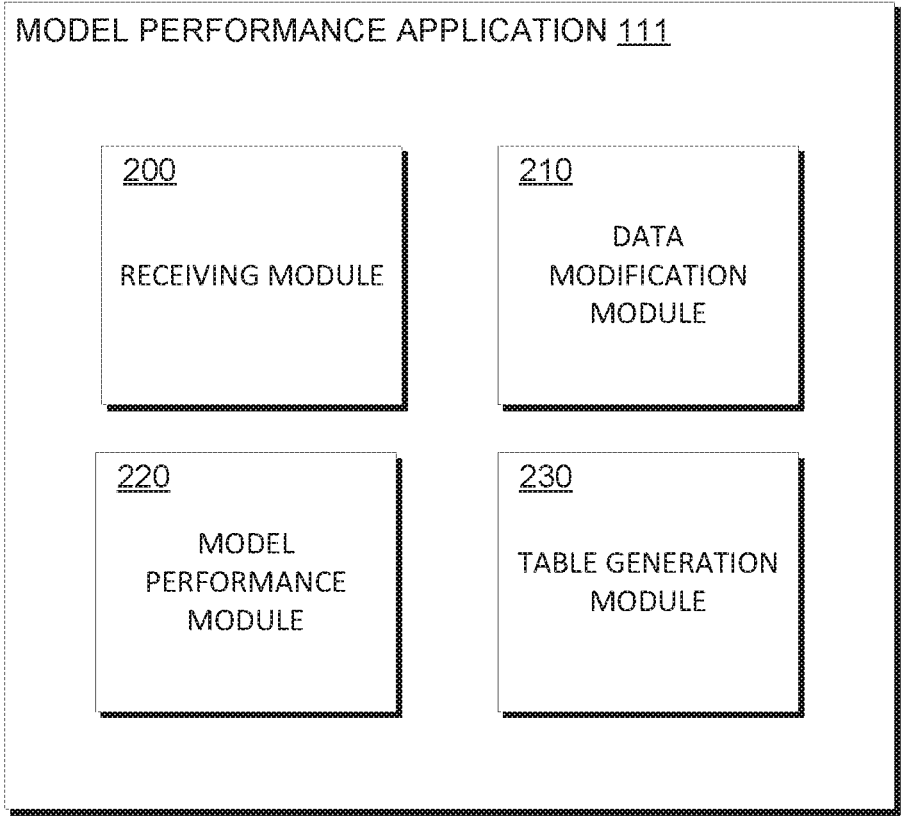
FIG. 2 is a functional block diagram illustrating the components of an application within the distributed data processing environment, in accordance with an embodiment of the present invention.

FIG. 2 is a functional block diagram illustrating the components of an application, for example, model performance application 111, within server 110, within the distributed data processing environment 100, in accordance with an embodiment of the present invention. Model performance application 111 includes receiving module 200, data modification module 210, model performance module 220, and table generation module 230.

In an embodiment, receiving module 200 receives a set of data from a data store, for example database 130. In an embodiment, receiving module 200 receives a request for model analysis from a user, for example via user device 120. In various embodiments, the request includes a machine leaning model, associated with the received set of data, for analysis associated with the analysis request. For example, receiving module 200 may receive a set of data that includes historical data on customer acquisition and attrition levels for a predetermined time period, and receive a request to analyze a predictive churn model to determine the churn model's predictive performance on modeling customer retention efforts related to the received set of customer data. Receiving module 200 may communicate the received set of data to data modification module 210 and the model associated with the analysis request to model performance module 220.

Data modification module 210 may receive the set of data from receiving module 200. Data modification module 210 is configured to split, or parse, the received data into one or more sets. In various embodiments, the received data is split into two sets, a set of training data and a set of testing data. It should be appreciated that the data sets may be split using any methods known in the art based on any predetermined characterizes of the data, for example, date ranges or data values above and below a threshold. For example, data modification module 210 may receive a set of customer activity data from receiving module 200 and split the customer activity data into a first set containing customer activity data from the year 1997 to the year 2007, and associate the first set with the label "training data", and into a second set containing customer activity data from the year 2008 to 2017 and associate the second set with the label "test data." Data modification module 210 may communicate training data set to model performance module 220.

In an embodiment, model performance module 220 receives the set of training data from data modification module 210. In an embodiment, model performance module 220 receives the machine leaning model associated with the analysis request directly from receiving module 200. In an alternative embodiment, model performance module 220 receives the machine leaning model associated with the analysis request from data modification module 210 along with the set of training data. Model performance module 220 may apply the received model to the set of training data using machine learning techniques known in the art. For example, a supervised model training method may be implemented, for the received model, where the received model is applied to the set of training data and fit to a known outcome. After the received model is trained using the received training data, the received model may be referred to, or known as, a trained model. After training the received model using the set of training data, model performance module 220 may query data modification module 210 for additional data, in order to test the performance, or accuracy, of the training. Data modification module 210 may communicate the second set of data of the data split by data modification module 210, or the set of testing data, to model performance module 220, in response to the query for more data for the testing the trained model.

In an embodiment, model performance module 220 applies the trained model to the set of testing data received from data modification module 210. Model performance module 220 may monitor and record the performance of the trained model as the testing data is processed by the trained model. In various embodiments, the performance of the model is a percentage accuracy score representing the percent alignment based on the trained model's predictions and the results after processing the test data. For example, if the model is trained to identify fraudulent banking transactions based on historical customer activity data (as training data), when the trained model is applied to data associated with one or more new transactions (as testing data), a prediction may be made based on a set of historical customer activity data, the performance of the trained model may be the percentage value of correctly identified fraudulent transactions, for example, 90% of fraudulent transactions were detected.

In various embodiments, if the recorded percentage accuracy score is above a predetermined threshold, model performance module 220 may associate the recorded percentage accuracy score with the label "baseline performance." In various embodiments, the performance score may include an associated target class distribution. For example, when solving a binary classification problem, a prediction, generated by the trained model, of the percent of data points in the two classes (class 1 and class 2) of the binary system will be determined. If the predetermined threshold for trained model's performance is 90% accuracy and trained model recorded performance of the test data is 95% accuracy, the 95% accuracy in performance is taken as the baseline performance and its corresponding target class distribution of 60% class 1 and 40% class 2.

In various embodiments, after the baseline performance score is determined, model performance module 220 may query data modification module 210 for additional test data. In various embodiments, data modification module 210 may provide additional test data, as a modified set of the test data, described in further detail below. In a system where test data is limited it may be advantageous to modify, or mutate, existing test data into a new set of modified test data in order to gain better insight on the performance of a model due by providing a larger data sample size in order to prevent overtraining or overfitting.

In such embodiments, data modification module 210 receives a query for additional test data from model performance module 220. Without additional sets of data provided to data modification module 210, data modification module 210 may generate additional test data by modifying the set of test data. In order to generate the modified test data, or additional data, in an embodiment data modification module 210 applies a weight value to the values associated with features within records of the original set of test data. In various embodiments, data modification module 210 may apply the weight randomly with a predetermined range with an upper weight threshold value and a lower weight threshold value. For example, given feature A, feature B and feature C, of record 1, data modification module 210 may apply weights to the values associated with features A, B, and C. In various embodiments, data modification module 210 receives a range of weights to apply to the set of test data to generate the modified test data, or additional data. Data modification module 210 may receive a weight range, w, of 20% having a lower threshold and upper threshold of −10% and +10% respectively. Data modification module 210 may apply a +3% weight for feature A, a +7% weight to feature B, and a −5% weight to feature C based on a random distribution of weights within the predetermined weight range w, the modifications being constrained by the predetermined thresholds of plus or minus 10% change in the feature value.

In various embodiments, the weight may be a predetermined fixed percent change in the associated value of one or more features of one or more records within the set of test data. In various embodiments, the weight may be applied one or more a similar, features within each record such that the same features of each record are modified, one or more random features within each record, or every feature of every record. In various embodiments, after applying a weight to one or more features in the set of test data, in order to generate a set of modified test data, data modification module 210 may communicate the set of modified test data to model performance module 220 and an average weight percentage change value to table generation module 230.

In an embodiment, model performance module 220 receives the set of modified test data from data modification module 210 and applies the trained model to the set of modified test data. In an embodiment, model performance module 220 again monitors and records the performance value of the trained model when applied to the set of modified test data. In an embodiment, model performance module 220 compares the recorded performance results values of the trained model with the performance baseline values of the trained model. In various embodiments, the comparison of the performance results value and the performance baseline value is represented as a percentage difference. For example, if the performance baseline value is 95% and the performance results value is 92% the difference percentage would be 3%. In an embodiment, model performance module 220 communicates the percentage difference value to table generation module 230.

Table generation module 230 may receive an average weight percentage change value from data modification module 210 and a difference percentage value from model performance module 220. Table generation module 230 may generate a table for display that is made up or rows and columns, columns may include header labels associated with the average weight percentage change and the difference percentage value. In various embodiments, the table may also include a column representing the percent change in a predetermined target class of interest. For example, user 120 may communicate class 1 as the preferred target class with the model analysis query.

In various embodiments, in response to a user input selection, via user device 120, additional sets of modified test data may be generated by data modification module 210 and communicated to model performance module 220 for further application. The next resulting performance values and difference percentages may be communicated to table generation module 230 and the generated table of results may be updated or added to.

Figure 3:
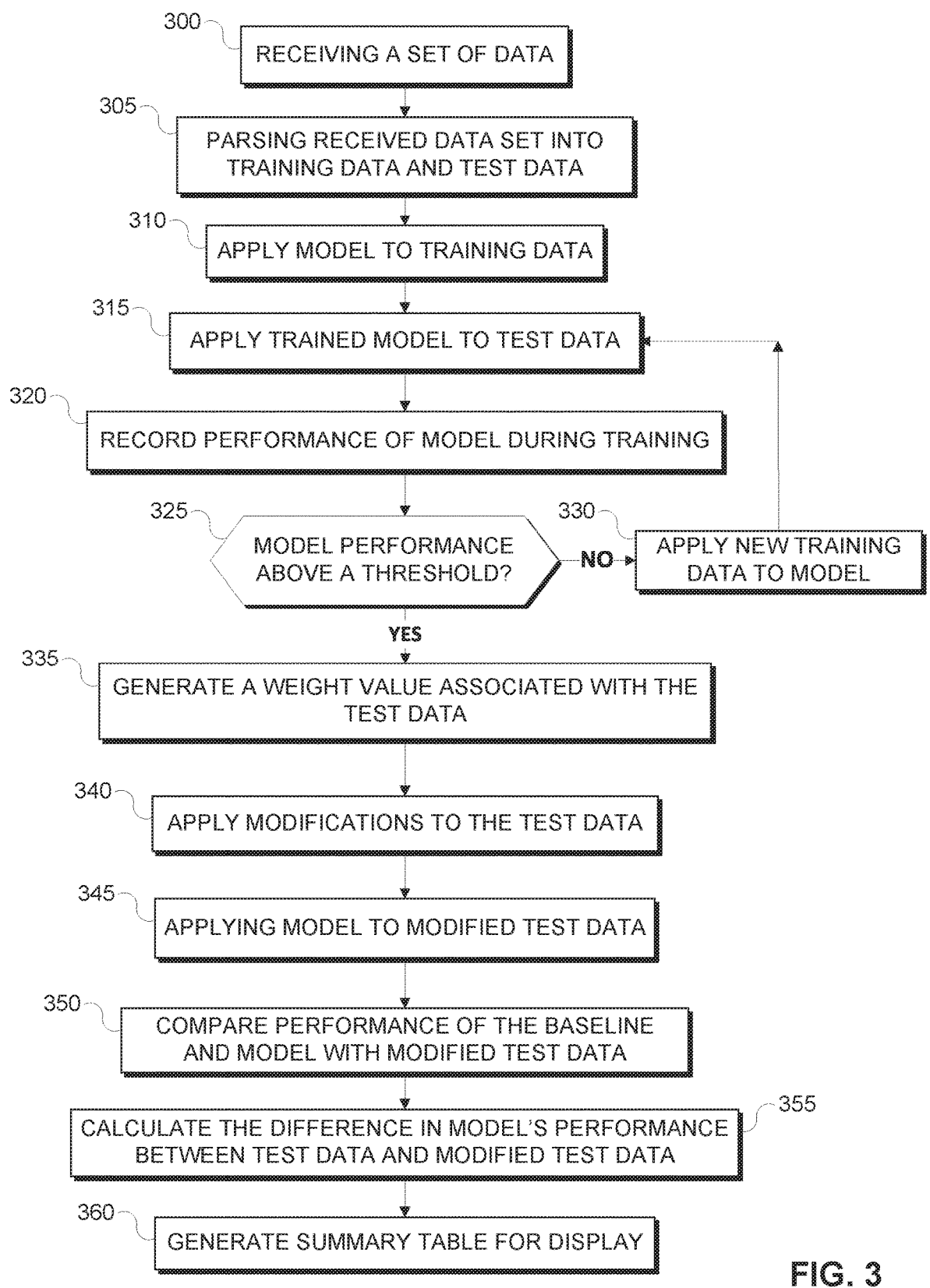
FIG. 3 is a flowchart depicting operational steps of an application, on a server computer within the data processing environment of FIG. 1, in accordance with an embodiment of the present invention.

FIG. 3 is a flowchart depicting operational steps of an application, on a server computer within the data processing environment of FIG. 1, in accordance with an embodiment of the present invention.

A set of data is received by receiving module 200 (block 300). Receiving module 200 communicates the set of data to data modification module 210. Data modification module 210 parses the received data sat into a subset of training data and a subset of test data (block 305). Data modification module 210 communicates the subset of training data to model performance module 220.

Model performance module 220 applies a machine learning model to the set of training data (block 310) in order to train the machine learning model. Model performance module 220 query data modification module 210 for a set of test data and receives the parsed set of test data from data modification module 210. Model performance module 220 applies the machine learning model to the set of received test data (block 315).

Model performance module 220 records the performance of the machine learning model after the test data is applied (block 320) as a performance percentage value, or baseline performance. If the baseline performance percentage value is below a threshold (block 325 "NO" branch), model performance module 220 query data modification module 210 for new training data to retrain the machine learning model (block 330). If the baseline performance percentage value is at or above a threshold (block 325 "YES" branch), model performance module 220 query data modification module 210 for a new set of test data.

Data modification module 210 generates a weight value (block 335) and applies the weight value to the set of test data in order to generate a set of modified test data (block 340). Data modification module 210 communicates the set of modified test data to model performance module 220 and model performance module 220 applies the trained machine learning model to the received set of modified test data (block 345). The performance of the machine learning model applies to the modified test data is recorded, or results performance, and compared to the baseline performance (block 350). Model performance module 220 calculates the difference in percent between the baseline performance value and the results performance value (block 355) and communicates the difference value to table generation module 230.

Table generation module 230 generates a table for display (block 360) to a user, for example user device 120 (FIG. 1). The generated table contains at least the difference percent value calculated by model performance module 220. Receiving module 200 may receive a user input selection based on the table generated by table generation module 230 to perform additional modifications to the test data and determine additional performance values. In response to receiving the user input, table generation module 230 may update the generated table with any subsequent difference values calculated during subsequent applications of the machine learning model to one or more additional sets of modified test data. It may be advantageous to continually modify the set of test data with additional, or random, weights in order to generate a larger data set to apple the machine learning model to than the originally received data set.

Figure 4:
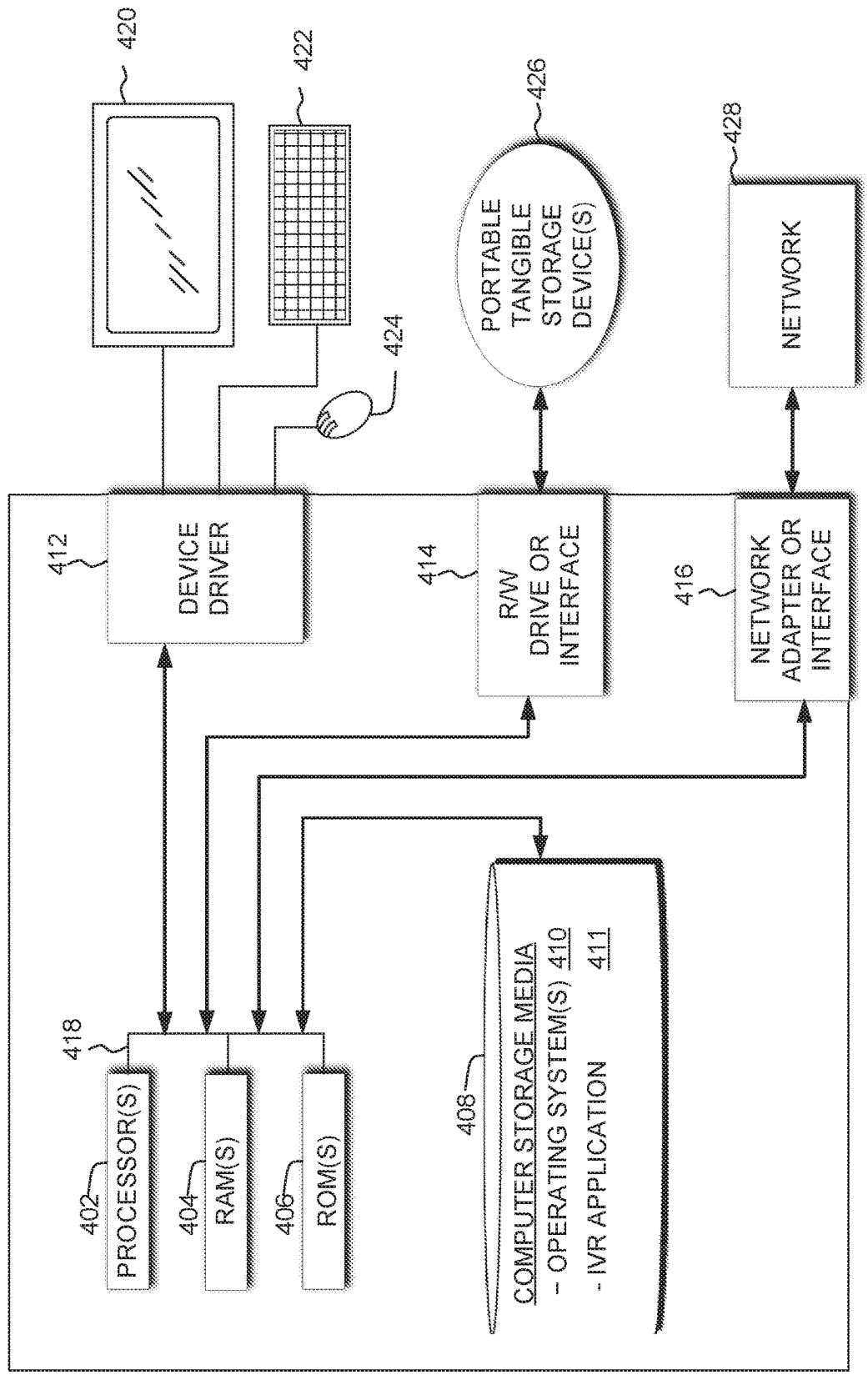
FIG. 4 depicts a block diagram of components of the server computer executing the application, in accordance with an embodiment of the present invention.

FIG. 4 depicts a block diagram of components of server 110, user device 120, and database 130 of distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110, user device 120, and database 130 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, model performance application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110, user device 120, and database 130 may also include a R/W drive or interface 414 to read from and write to one or more portable computer readable storage media 426. Application programs 411 on server 110, user device 120, and database 130 may be stored on one or more of the portable computer readable storage media 426, read via the respective R/W drive or interface 414 and loaded into the respective computer readable storage media 408.

Server 110, user device 120, and database 130 may also include a network adapter or interface 416, such as a TCP/IP adapter card or wireless communication adapter (such as a 4G wireless communication adapter using OFDMA technology) for connection to a network 428. Application programs 411 on server 110, user device 120, and database 130 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 708. The network may comprise copper wires, optical fibers, wireless transmission, routers, firewalls, switches, gateway computers and/or edge servers.

Server 110, user device 120, and database 130 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for mitigating machine learning performance digression due to insufficient test data availability, the method comprising:
    receiving a set of data, wherein the set of data comprises a plurality of records, each record of the plurality of records comprises one or more features and associated feature values;
    parsing the received set of data into a set of training data and a set of test data;
    generating a trained model by applying a model to the set of training data;
    applying the trained model to the set of test data;
    recording a first set of performance values of the tested trained model, wherein the first set of performance values includes at least a test data accuracy percentage value;
    in response to the recorded test data accuracy percentage value of the trained model being above a threshold, associating the recorded test data accuracy percentage value with a performance baseline value;
    generating a set of modified test data, wherein generating the set of modified test data comprises applying a weight value to at least one of the associated feature values of the one or more features of each record of the plurality of records associated with the set of test data;
    applying the trained model to the set of modified test data;
    recording a second set of performance values, wherein the second set of performance values includes at least a modified test data accuracy percentage value;
    associating the recorded modified test data accuracy percentage value with a performance results value;
    calculating a performance difference value based on the performance baseline value and performance results value; and
    generating a table for display, wherein the generated table includes at least:
        the applied weight value,
        a class distribution value, and
        the performance difference value.

2. The method of claim 1, wherein calculating a performance difference value further comprises:
    calculating a percentage difference between the performance baseline value and the performance results value.

3. The method of claim 1, wherein the method further comprises:
    communicating the generated table for display;
    receiving a user input selection, in response to communicating the generated table for display, and
    modifying the trained model based on the user input selection.

4. The method of claim 1, wherein the applying the trained model to the set of test data is performed via a supervised learning model trained to a known outcome.

5. The method of claim 1, wherein the applied weight value is a random percentage value between an upper weight threshold value and a lower weight threshold value.

6. The method of claim 1, wherein the applied weight value is a predetermined fixed percent change associated with a user input selection.

7. The method of claim 1, wherein the applied weight value is modifying one of:
    a similar single feature within each record of the plurality of records; or
    a single feature within each record, wherein the single feature is a randomly selected feature within each record.

8. A computer program product for mitigating machine learning performance digression due to insufficient test data availability, the computer program product comprising:
    one or more computer-readable storage media and program instructions stored on the one or more computer-readable storage media, the program instructions comprising:
    instructions to receive a set of data, wherein the set of data comprises a plurality of records, each record of the plurality of records comprises one or more features and associated feature values;
    instructions to parse the received set of data into a set of training data and a set of test data;
    instructions to generate a trained model by applying a model to the set of training data;
    instructions to apply the trained model to the set of test data;
    instructions to record a first set of performance values of the tested trained model, wherein the first set of performance values includes at least a test data accuracy percentage value;
    in response to the recorded test data accuracy percentage value of the trained model being above a threshold, instructions to associate the recorded test data accuracy percentage value with a performance baseline value;
    instructions to generate a set of modified test data, wherein instructions to generate the set of modified test data comprises applying a weight value to at least one of the associated feature values of the one or more features of each record of the plurality of records associated with the set of test data;
    instructions to apply the trained model to the set of modified test data;
    instructions to record a second set of performance values, wherein the second set of performance values includes at least a modified test data accuracy percentage value;

instructions to associate the recorded modified test data accuracy percentage value with a performance results value;

instructions to calculate a performance difference value based on the performance baseline value and performance results value; and instructions to generate a table for display, wherein the generated table includes at least:
the applied weight value,
a class distribution value, and
the performance difference value.

9. The computer program product of claim 8, wherein calculating a performance difference value further comprises:
instructions to calculate a percentage difference between the performance baseline value and the performance results value.

10. The computer program product of claim 8, wherein the method further comprises:
instructions to communicate the generated table for display;
instructions to receive a user input selection, in response to communicating the generated table for display, and
instructions to modify the trained model based on the user input selection.

11. The computer program product of claim 8, wherein the instructions to apply the trained model to the set of test data is performed via a supervised learning model trained to a known outcome.

12. The computer program product of claim 8, wherein the applied weight value is a random percentage value between an upper weight threshold value and a lower weight threshold value.

13. The computer program product of claim 8, wherein the applied weight value is a predetermined fixed percent change associated with a user input selection.

14. The computer program product of claim 8, wherein the applied weight value is modifying one of:
a similar single feature within each record of the plurality of records; or
a single feature within each record, wherein the single feature is a randomly selected feature within each record.

15. A computer system for mitigating machine learning performance digression due to insufficient test data availability, the computer system comprising:
one or more computer processors;
one or more computer-readable storage media;
program instructions stored on the computer-readable storage media for execution by at least one of the one or more processors, the program instructions comprising:
instructions to receive a set of data, wherein the set of data comprises a plurality of records, each record of the plurality of records comprises one or more features and associated feature values;
instructions to parse the received set of data into a set of training data and a set of test data;
instructions to generate a trained model by applying a model to the set of training data;
instructions to apply the trained model to the set of test data;
instructions to record a first set of performance values of the tested trained model, wherein the first set of performance values includes at least a test data accuracy percentage value;
in response to the recorded test data accuracy percentage value of the trained model being above a threshold, instructions to associate the recorded test data accuracy percentage value with a performance baseline value;
instructions to generate a set of modified test data, wherein instructions to generate the set of modified test data comprises applying a weight value to at least one of the associated feature values of the one or more features of each record of the plurality of records associated with the set of test data;
instructions to apply the trained model to the set of modified test data;
instructions to record a second set of performance values, wherein the second set of performance values includes at least a modified test data accuracy percentage value;
instructions to associate the recorded modified test data accuracy percentage value with a performance results value;
instructions to calculate a performance difference value based on the performance baseline value and performance results value; and
instructions to generate a table for display, wherein the generated table includes at least:
the applied weight value,
a class distribution value, and
the performance difference value.

16. The computer system of claim 15, wherein calculating a performance difference value further comprises:
instructions to calculate a percentage difference between the performance baseline value and the performance results value.

17. The computer system of claim 15, wherein the method further comprises:
instructions to communicate the generated table for display;
instructions to receive a user input selection, in response to communicating the generated table for display, and
instructions to modify the trained model based on the user input selection.

18. The computer system of claim 15, wherein the instructions to apply the trained model to the set of test data is performed via a supervised learning model trained to a known outcome.

19. The computer system of claim 15, wherein the applied weight value is a random percentage value between an upper weight threshold value and a lower weight threshold value.

20. The computer system of claim 15, wherein the applied weight value is modifying one of:
a similar single feature within each record of the plurality of records; or
a single feature within each record, wherein the single feature is a randomly selected feature within each record.

* * * * *